(12) United States Patent
Chen et al.

(10) Patent No.: US 8,126,834 B2
(45) Date of Patent: Feb. 28, 2012

(54) DYNAMIC CONSTRAINT SATISFACTION PROBLEM SOLVER WITH HIERARCHICAL UNION CONSTRAINTS

(75) Inventors: Gao Chen, Beijing (CN); Claire M. Bagley, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 12/427,037

(22) Filed: Apr. 21, 2009

(65) Prior Publication Data

US 2010/0268678 A1 Oct. 21, 2010

(51) Int. Cl.
*G06F 17/00* (2006.01)
*G06N 5/02* (2006.01)
(52) U.S. Cl. .......................................................... 706/46
(58) Field of Classification Search ...................... 706/46
See application file for complete search history.

(56) References Cited

U.S. PATENT DOCUMENTS

| | | | |
|---|---|---|---|
| 7,069,537 B2 | 6/2006 | Lazarov | |
| 7,333,968 B2 | 2/2008 | Geller et al. | |
| 7,515,156 B2 * | 4/2009 | Tinker et al. | 345/474 |
| 8,065,255 B2 * | 11/2011 | Colena et al. | 706/46 |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2004/0019852 A1 | 1/2004 | Purvis | |
| 2005/0198621 A1 | 9/2005 | Tillmann et al. | |
| 2005/0278271 A1 | 12/2005 | Anthony et al. | |
| 2007/0094184 A1 | 4/2007 | Emek et al. | |

OTHER PUBLICATIONS

Grid workflow recovery as Dynamic constraint satisfaction problem, Dragiev, S.; Schneider, J.; Open Systems (ICOS), 2010 IEEE Conference on Digital Object Identifier: 10.1109/ICOS.2010.5720067 Publication Year: 2010 , pp. 74-79.*
Frühwirth, Thom et al., "Principles of Constraint Systems and Constraint Solvers", Archives of Control Sciences: Special Issue on Constraint Programming, 16(2) http://www.informatik.uni-ulm.de/pm/mitarbeiter/fruehwirth/Papers/acs-systems3.pdf, 2006.
Lhomme, Olivier, "Consistency Techniques for Numeric CSPs", Proceedings in IJCAI-93 pp. 232-238, 1993 Chambery, France.
Selectica, "Selectica Configuration", Solution Overview, 2005, Selectica, Inc., San Jose, CA.
ILOG, "ILOG Configurator, Powering online product and service configuration applications", Product Datasheet, Mar. 2005, ILOG.S.A.
Oracle, "Oracle Configurator", Oracle Data Sheet, 2008, Oracle.
Tacton, "Tacton's Sales Configurator—Bridging the gap between engineering and sales for selling customized products.", http://www.tacton.com/templates/page__68.aspx?epslanguage=EN, 2007, Tacton Systems AB, Sweden.

(Continued)

*Primary Examiner* — Michael B Holmes
(74) *Attorney, Agent, or Firm* — Squire Sanders (US) LLP

(57) ABSTRACT

A dynamic constraint solver system for solving a constraint satisfaction problem model includes a plurality of ports. The system defines a hierarchical union that includes all problems in a lower port that is in a problem under another port in the model. The system generates a constraint that computes a cardinality of the hierarchical union and determines an included set and an excluded set for the hierarchical union. The system then propagates the included set and excluded set to participating ports of the hierarchical union.

16 Claims, 10 Drawing Sheets

OTHER PUBLICATIONS

Benhamou, Frédérick et al., "Applying Interval Arithmetic to Real, Integer and Boolean Constraints", Journal of Logic Programming, 32(1), 1997.

Sabin, Daniel et al., "Configuration as Composite Constraint Satisfaction", Proceedings of the (1st) Artificial Intelligence and Manufacturing Research Planning Workshop, 1996.

Fleischanderl, Gerhard et al., "Configuring Large Systems Using Generative Constraint Satisfaction", IEEE, pp. 59-68, No. 1094-7167/98, Jul./Aug. 2008, IEEE.

Mittal, Sanjay et al., "Dynamic Constraint Satisfaction Problems", Proceedings of the Eighth National Conference on Artificial Intelligence, 1996.

Stumptner, Markus et al., "Generative Constraint-Based Configuration of Large Technical Sytems", Artificial Intelligence for Engineering Design, analysis and Manufacturing, pp. 307-320, No. 12, 1998, Cambridge University Press, USA.

Gelle, Esther et al., "Solving Methods for Conditional Constraint Satisfaction", IJCAL, 2003.

* cited by examiner

DYNAMIC CONSTRAINT SATISFACTION PROBLEM SOLVER WITH HIERARCHICAL UNION CONSTRAINTS

FIELD OF THE INVENTION

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Known CSP solvers do not allow the representation of conditional structure or reasoning over an inclusion of a variable in a solution. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

One known approach to minimize large CSP problems is referred to as "Conditional CSP", and includes the notion of a variable being active or inactive, as well as constraints to activate a variable. In this approach, a variable is only assigned a value in the final solution if it is active. Conditional CSP is limited in that it does not provide any significant space savings in large problems, nor does it allow for segmentation of related variables into sub-problems. Another known approach is referred to as "Generative CSP" and extends Conditional CSP by introducing the concept of components, which are groups of related variables, and component type, which is the further extension and specialization of these components. However, similar to Conditional CSP, Generative CSP is still implemented in terms of activity state and does not provide real space savings.

SUMMARY OF THE INVENTION

One embodiment is a dynamic constraint solver system for solving a constraint satisfaction problem model that includes a plurality of ports. The system defines a hierarchical union that includes all problems in a lower port that is in a problem under another port in the model. The system generates a constraint that computes a cardinality of the hierarchical union and determines an included set and an excluded set for the hierarchical union. The system then propagates the included set and excluded set to participating ports of the hierarchical union.

DETAILED DESCRIPTION

One embodiment is a dynamic constraint satisfaction problem solver that implements a hierarchical union operator and corresponding constraint for a constraint satisfaction problem. The hierarchical union determines the union of all instances in a port within all instances of another port.

Figure 1:
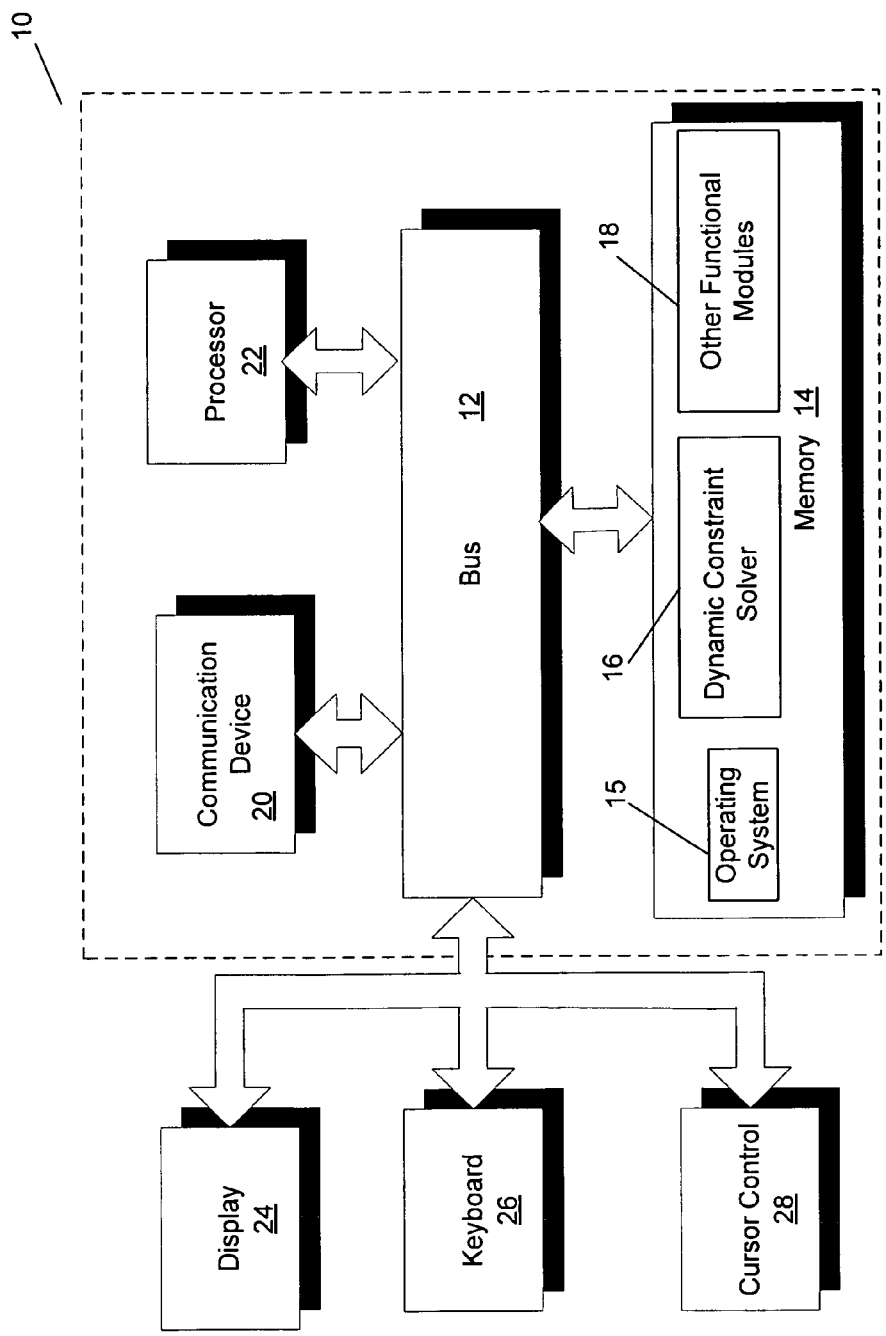
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving for models using hierarchy union operators as disclosed in more detail below. System 10 can be part of a larger system that includes a constraint solver, such as a product configurator or artificial intelligence system. Therefore, system 10 will typically include one or more additional functional modules 18 to include the additional functionality.

Figure 2:
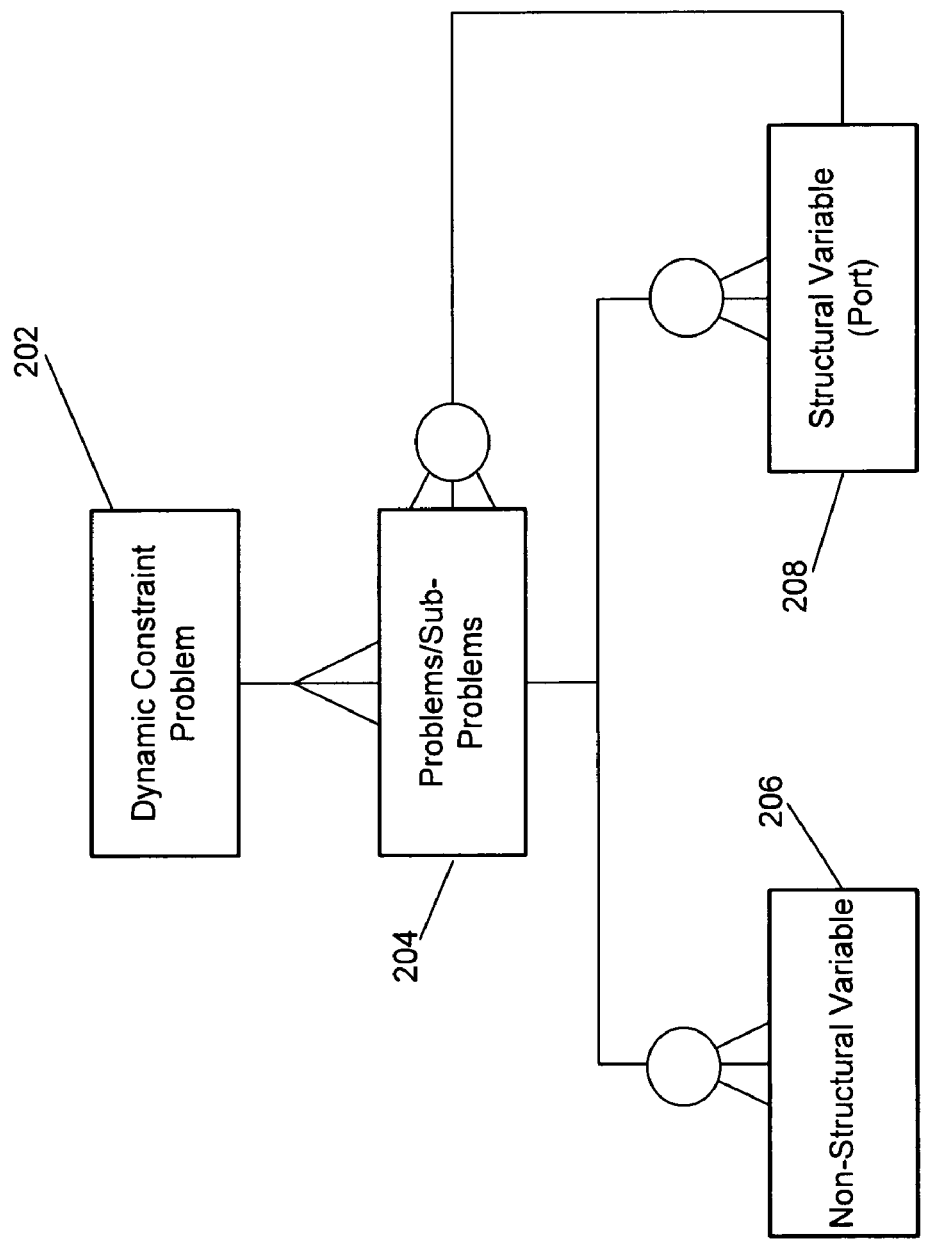
FIG. 2 illustrates the hierarchy of a model of a dynamic constraint problem in accordance with one embodiment.

FIG. 2 illustrates the hierarchy of a model of a dynamic constraint problem 202 in accordance with one embodiment. Dynamic constraint problem 202 includes one or more problems or sub-problems 204 (a "sub-problem" may also be a "problem", and vice versa depending on where it falls in the hierarchy). In an embodiment where the dynamic constraint problem is for a product configurator, the problems/sub-problems are the components/sub-components of the configurator.

Each problem is formed of zero or more non-structural variables 206. Examples of non-structural variables 206 includes Boolean variables, integers, floating point variables, etc. Each problem 204 may also include zero or more structural variables or "ports" 208. A port is a container for problems and connects sub-problems to the problem or to another sub-problem or acts as an extension point from one problem to another problem. Each port 208 can be connected to zero or more sub-problems 204. A port may be defined by two items: (a) the definition of the problem to be connected to the port; and (b) a numeric domain representing how many instances of the problem is required or allowed in the port (referred to as the port's "cardinality").

For example, a problem definition for problem A may be as shown in Example 1 below (the bracketed information indicates the domain for the problem/port):

```
ProblemA
|_Port to ProblemB [0..5]
   |_Resource [1..10]
```

EXAMPLE 1

As shown in the definition, Problem A includes a port to Problem B. According to that port, Problem A may include zero to five Problem Bs. Each Problem B is defined with an integer amount of Resource [1 . . . 10] that it can provide to a resource sum, which is the sum of all resources of Problem Bs that are connected to the port to Problem B. A resource sum constraint is further disclosed in pending U.S. patent application Ser. No. 12/362,209, filed on Jan. 29, 2009, and herein incorporated by reference. The cardinality domain for the port to Problem B is [0 . . . 5].

In one embodiment, a "hierarchical union" operator represents all problems in a lower port that is in a problem under another port. Example 2 below illustrates a model that a hierarchical union can be applied to:

```
ProblemA
|_Port1 (to ProblemB) [0..4]
   |_Port2 (to ProblemC) [0..5]
      |_Resource [1..10]
```

EXAMPLE 2

A hierarchical union operator "Port1.HierarchicalUnion(Port2)" represents the collection of all Problem Cs under Problem Bs that are under Problem A.

Figure 3:
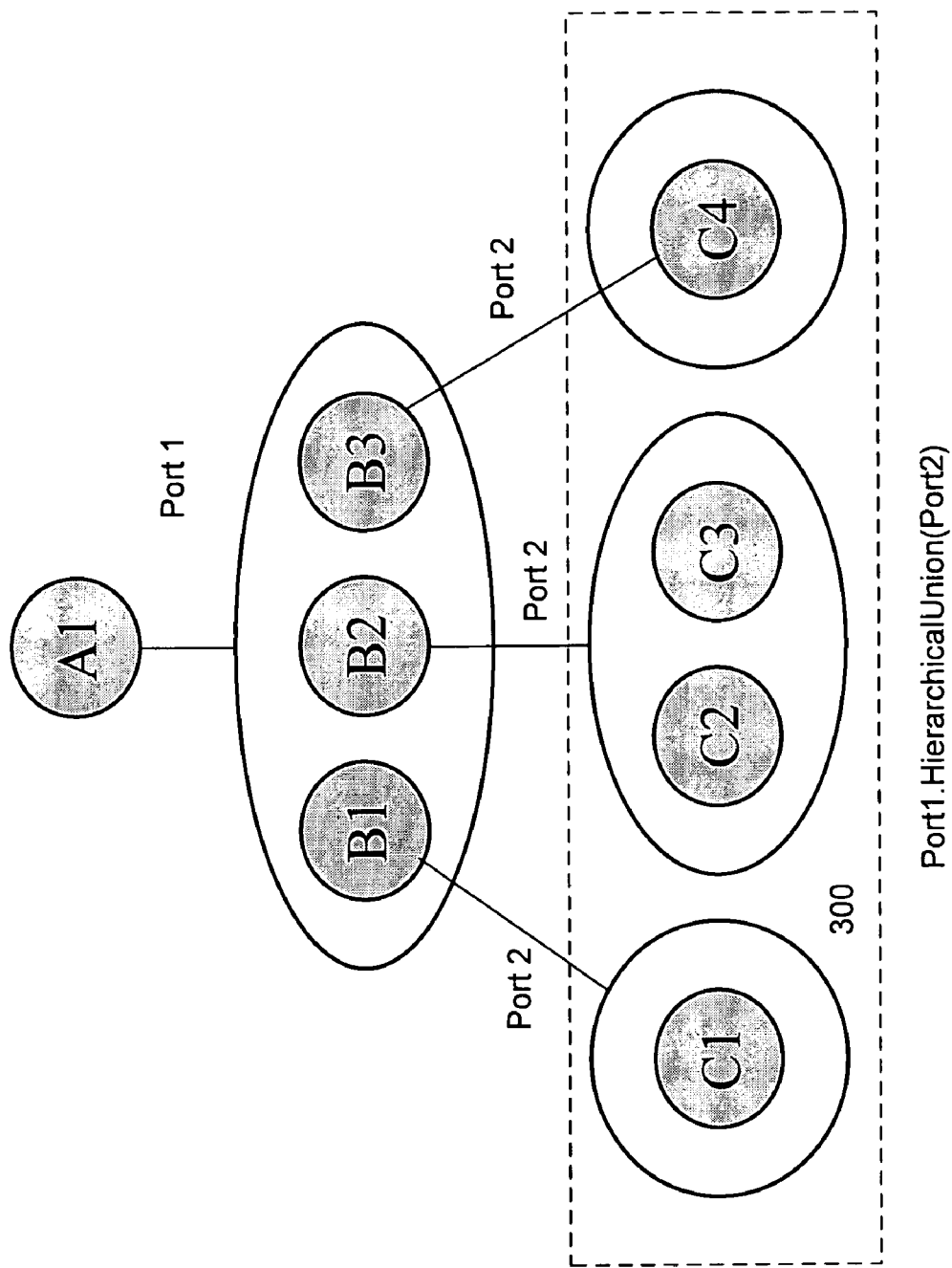
FIG. 3 illustrates a configuration of the model in accordance with one embodiment.

FIG. 3 illustrates a configuration of the model of Example 2 in accordance with one embodiment. In the configuration of FIG. 3, when configuring a Problem A (A1), a user created three Problem Bs in Port 1 (B1, B2, B3). Further under Port 2 of each Problem B, the user creates one or two Problem Cs (C1 under B1, C2 and C3 under B2, and C4 under B3). In the configuration of FIG. 3, the hierarchical union operator "Port1.HierarchicalUnion(Port2)" represents the collection of {C1, C2, C3, C4} in box 300.

In one embodiment, the hierarchical union is used to reason over variables that are aggregated over a nested hierarchy of potential dynamic instances. For example, using Example 2, the hierarchical union can be used to aggregate the resource variable over all Problem Cs under Problem A through Problem B using: Port1.HierarchicalUnion(Port2).sum(Resource). This hierarchical union provides all Problem Cs under Problem A through Problem B so that a resource sum constraint can collect all resources over these Problem Cs.

A port variable represents a collection of problems. Its domain composes the port's cardinality, a collection of problems that are already included in the port (referred to as its "included set"), a collection of problems that are already excluded from the port (referred to as its "excluded set"), as well as candidate problems that are neither excluded nor included in the set at that moment.

As an example, consider the following model (Example 3):

```
ProblemA
|_Port1 (to ProblemB) [0..5]
```

EXAMPLE 3

Figure 4:
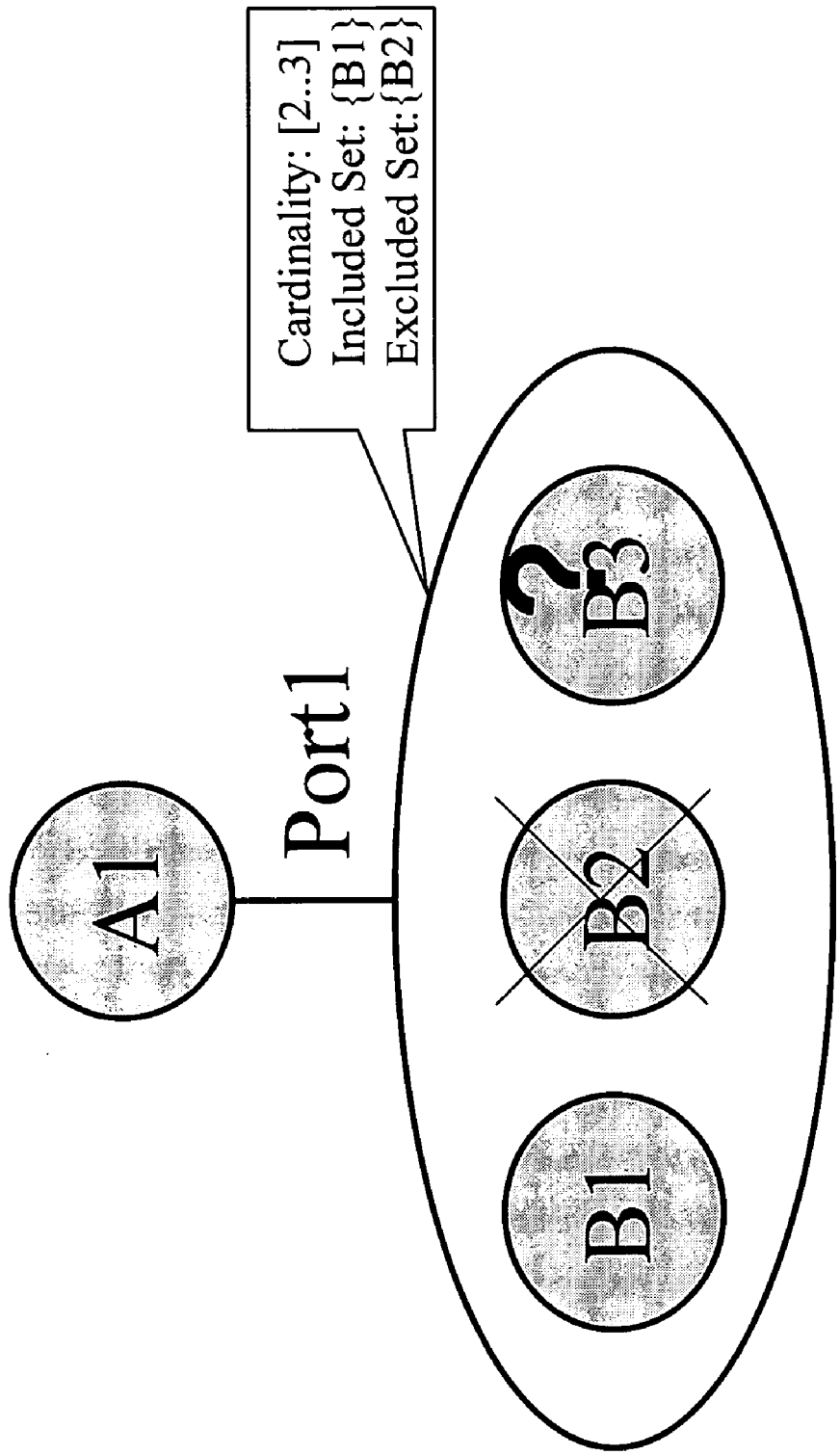
FIG. 4 illustrates an instantiation of a model in accordance with one embodiment.

FIG. 4 illustrates an instantiation of Example 3 in accordance with one embodiment. In the instantiation shown in FIG. 4, there are three instances of Problem B generated in the system (B1, B2 and B3). According to a constraint, Port 1 requires at least two problems but no more than three. B1 is already included in Port 1, B2 is excluded from Port 1, and B3 is neither included nor excluded, meaning it is possible to either include or exclude B3 later. In this instantiation, the following are valid solutions for Port 1:

{B1, B3};
{B1, B3, a new Problem B};
{B1, a new Problem B};
{B1, a new Problem B, another new Problem B}.

In any solution, Port 1 has either 2 or 3 instances of Problem B. It includes B1 and does not include B2. It may or may not include B3.

Figure 5:
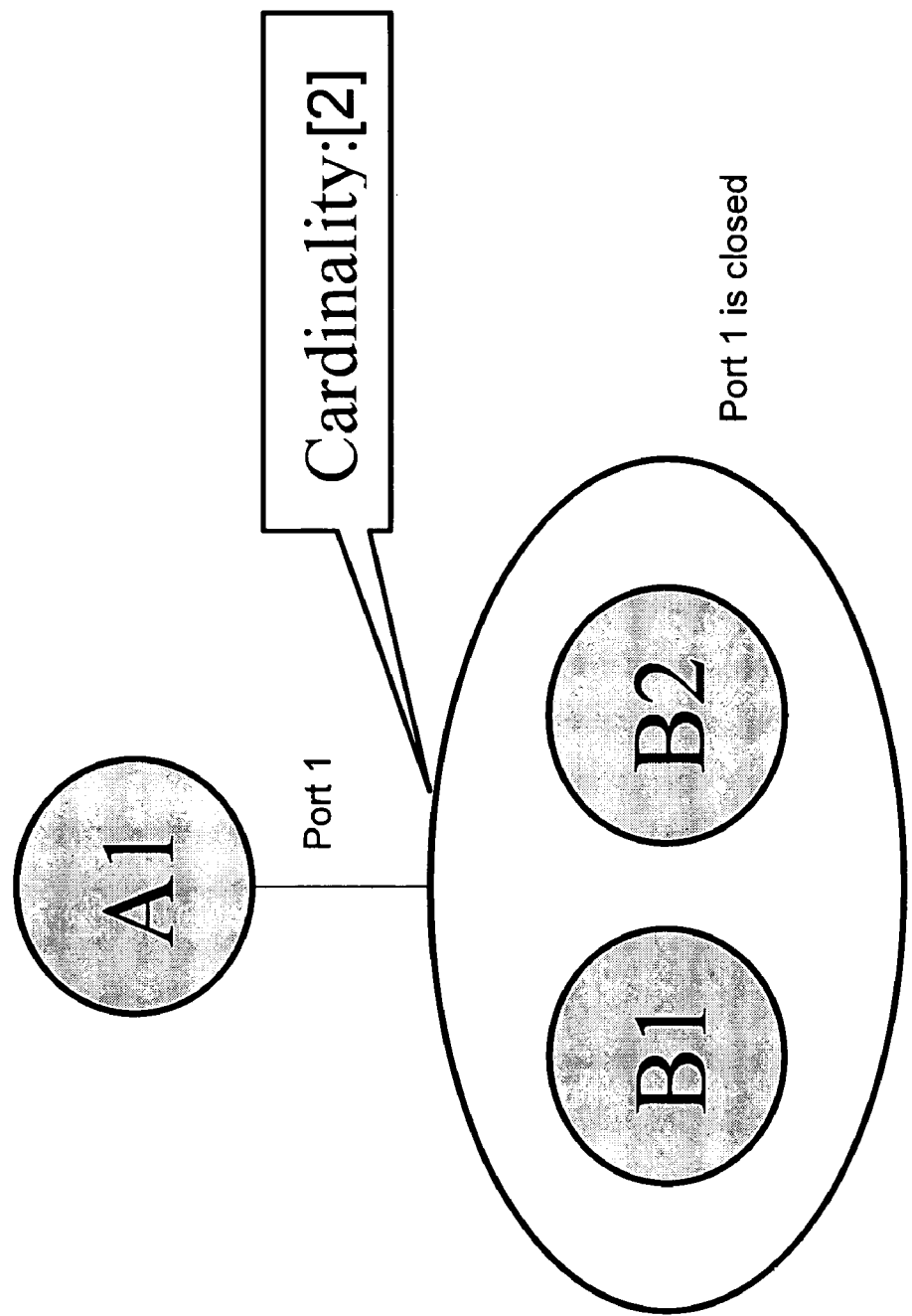
FIG. 5 illustrates an example instantiation of a port with a cardinality of two.

In one embodiment, a port is "closed" when it cannot take any new candidates, or its candidates are restricted to a known set of instances. This can happen when a port is fully bound, or when it is a subset of another port that is closed. When a port is bound, the number of problems the port can have in the final solution is already determined as the bound cardinality, and all these problems have been determined since they are already in the port. The port has no room for any new problems and hence is closed. FIG. 5 illustrates an example instantiation of a Port 1 with a cardinality of two. Since Port 1 already has two problems in it, it cannot have any new problems. Hence Port 1 is bound and closed.

If a port A is a subset of a port B which is closed, port B cannot have any new candidates. It can be implied that port A also cannot have any new candidates, and therefore port A is also closed. For example, consider a port "P1" defined with a cardinality [2 . . . 2] and a port "P2" defined with cardinality [0 . . . 4]. P1 and P2 are the same type of ports, meaning they can contain instances of problems of the same type definition. Consider also a constraint that states that P1 is a subset of P2. Assume P2's cardinality is bound to the value 3 and contains 3 sub-problems: P2#1, P2#2 and P2#3. P2 is closed since it is bound, and P1 it also closed since it is a subset of a closed port, but P1 is not bound. P1's cardinality is bound to 2, but there are 3 candidates for 2 "spots" in this port (e.g., any combination of 2 problems from the set {P2#1, P2#2, P2#3}). Although it cannot be decided for now which two will be finally selected for the solution, P1 is closed since it cannot take any new candidates.

In one embodiment, the hierarchical union represents all problems in a lower port that is in a problem under another port, and therefore it is a collection of problems itself. Consequently, a hierarchical union can also be considered a port having its own cardinality, included set and excluded set.

As an example of a hierarchical union as a port, consider the model in Example 4 below:

---
ComponentA
|_Port1 (to ComponentB) [0..4]
   |_Port2 (to ComponentC) [0..5]
---

EXAMPLE 4

For the hierarchical union constraint of "Port1.HierarchicalUnion(Port2)", another constraint can be generated internally to compute the cardinality of the hierarchical union: "HierarchicalUnion.Cardinality=Port1.sum (Port2.Cardinality)". The right hand side of this constraint is a resource sum constraint that sums up the cardinality of all Port 2 on Problem Bs in Port 1.

Referring again to the instantiation of FIG. 3 as an example of the constraint to determine the cardinality of a hierarchical union, there are three Problem Bs in Port 1. Under B1, there is one Problem C. Under B2, there are two Problem Cs. Under B3, there is another Problem C. Therefore:

$$Port1.HierarchicalUnion\,(Port2)\text{'s Cardinality} =$$

$$Port1.\text{sum}(Port2\text{'s Cardinality}) = B1.Port2\text{'s Cardinality} +$$

$$B2.Port2\text{'sCardinality} + B3.Port2\text{'s Cardinality} = 1 + 2 + 1 = 4.$$

For simplicity purposes, the above example illustrates a case where the cardinality of each port is bound to a value. In contrast, in general, embodiments compute the domain of the cardinality which includes a lower bound and an upper bound. This internal constraint can reduce information in all directions. For example, it can reduce the domain of the hierarchical union's cardinality. It can reduce the domain of Port 1's cardinality. It can also reduce the domain of Port 2's cardinality on a Problem B in Port 1.

Figure 6:
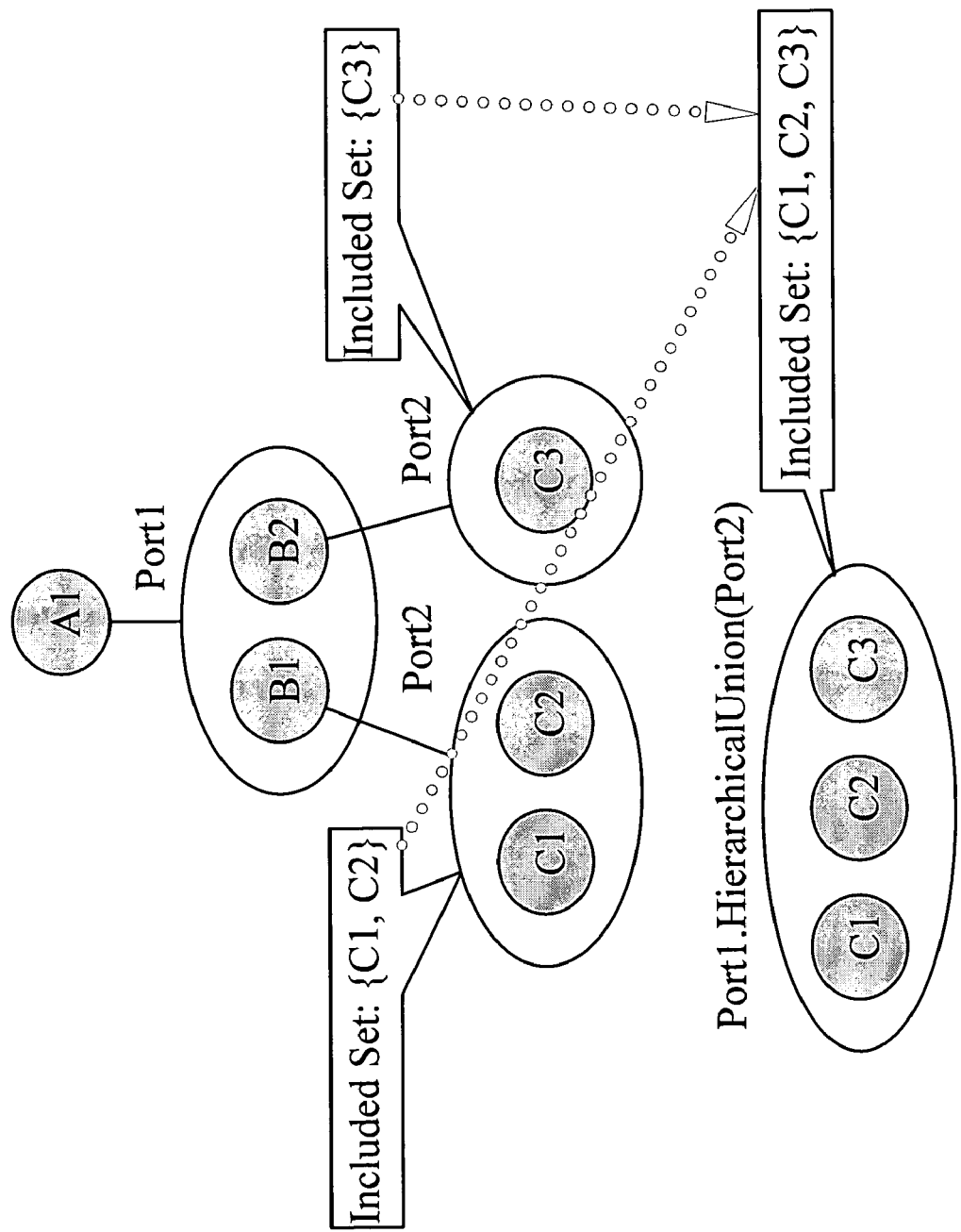
FIG. 6 illustrates a solver keeping track of all Port 2s on the problems in Port 1 in accordance with one embodiment.

In one embodiment, solver 16 computes the included set of the hierarchical union. As illustrated in FIG. 6, solver 16 first keeps track of all Port 2s on the problems in Port 1. To compute the included set of the hierarchical union, solver 16 iterates through all Port 2s, and adds all problems in each Port 2's included set to the included set of the hierarchical union. Therefore, when the user creates C2 in B1.Port2 and C3 in B2.Port2, solver 16 scans B1.Port2 and B2.Port2 and adds C2 and C3 to the included set of the hierarchical union.

In one embodiment, solver 16 propagates the excluded set to participating Port 2s. If, for some reason, a Problem C is excluded from the hierarchical union, then solver 16 knows that this Problem C must also be excluded from any Port 2 on a Problem B in Port 1. Therefore, solver 16 keeps track of all Port 2s on the problems in Port 1. It iterates through all Port 2s, and excludes all problems in the hierarchical union's excluded set from each Port 2 by adding them to the Port 2's excluded set.

Figure 7:
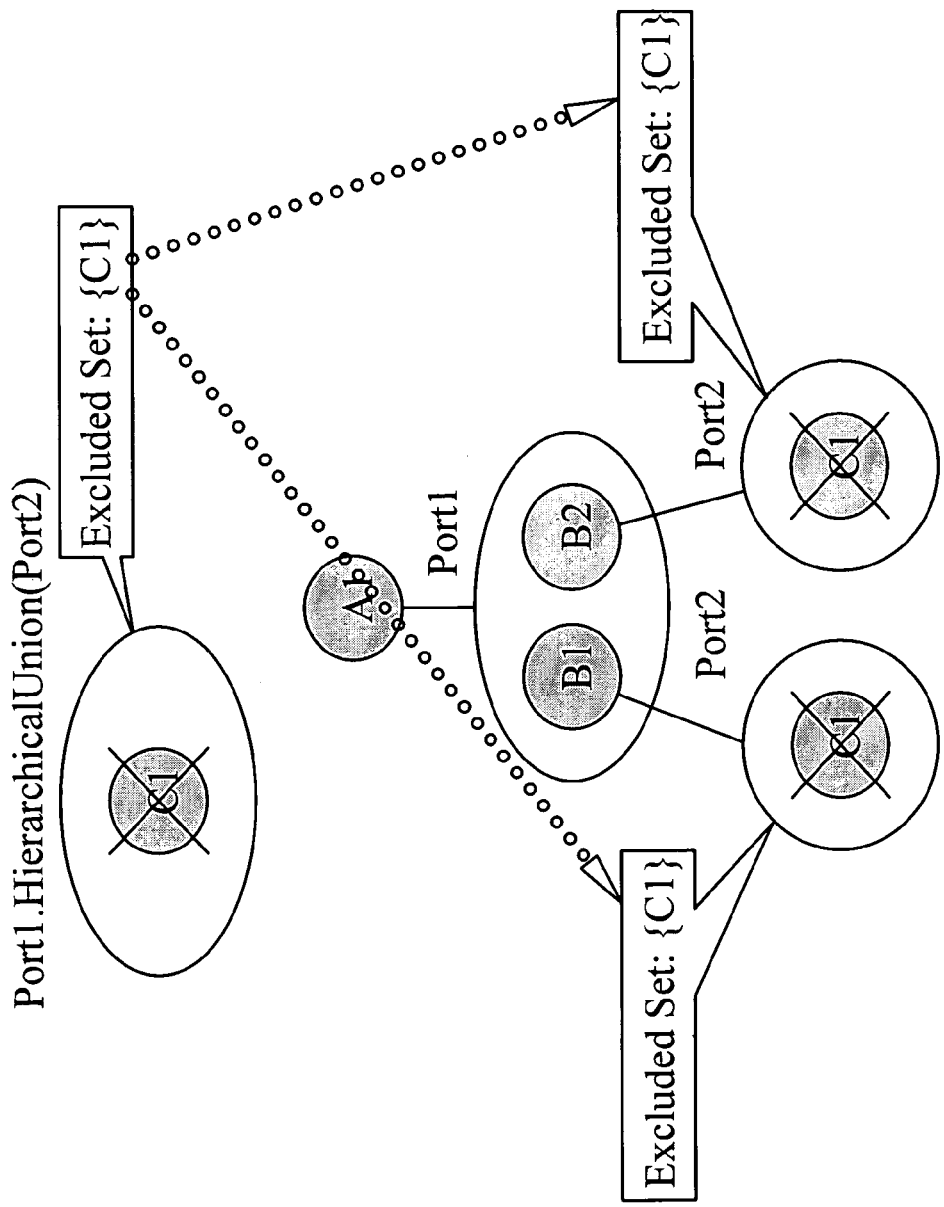
FIG. 7 illustrates the propagation of the excluded set in accordance with one embodiment.

FIG. 7 illustrates the propagation of the excluded set in accordance with one embodiment. In the example of FIG. 7, there are two Problem Bs in Port 1 (i.e., B1 and B2). After the propagation of some user selection, a Problem C (i.e., C1), is excluded from the hierarchical union. Therefore, it is inferred that C1 must also be excluded from B1.Port2 and B2.Port2.

In one embodiment, solver 16 then computes the excluded set. The excluded set for the hierarchical union can be computed when Port 1 is closed such that Port 1 can have no new Problem Bs in it. Otherwise, if Port 1 can still have a new Problem B later, nothing can be excluded from the hierarchical union since the Port 2 under the possible new Problem B may include anything. Solver 16 keeps track of all Port 2s on the problems in Port 1. If Port 1 is closed, solver 16 iterates through all Port 2s, looking for problems that are excluded from all Port 2s. It then excludes these problems from the hierarchical union by adding them to the hierarchical union's excluded set.

Figure 8:
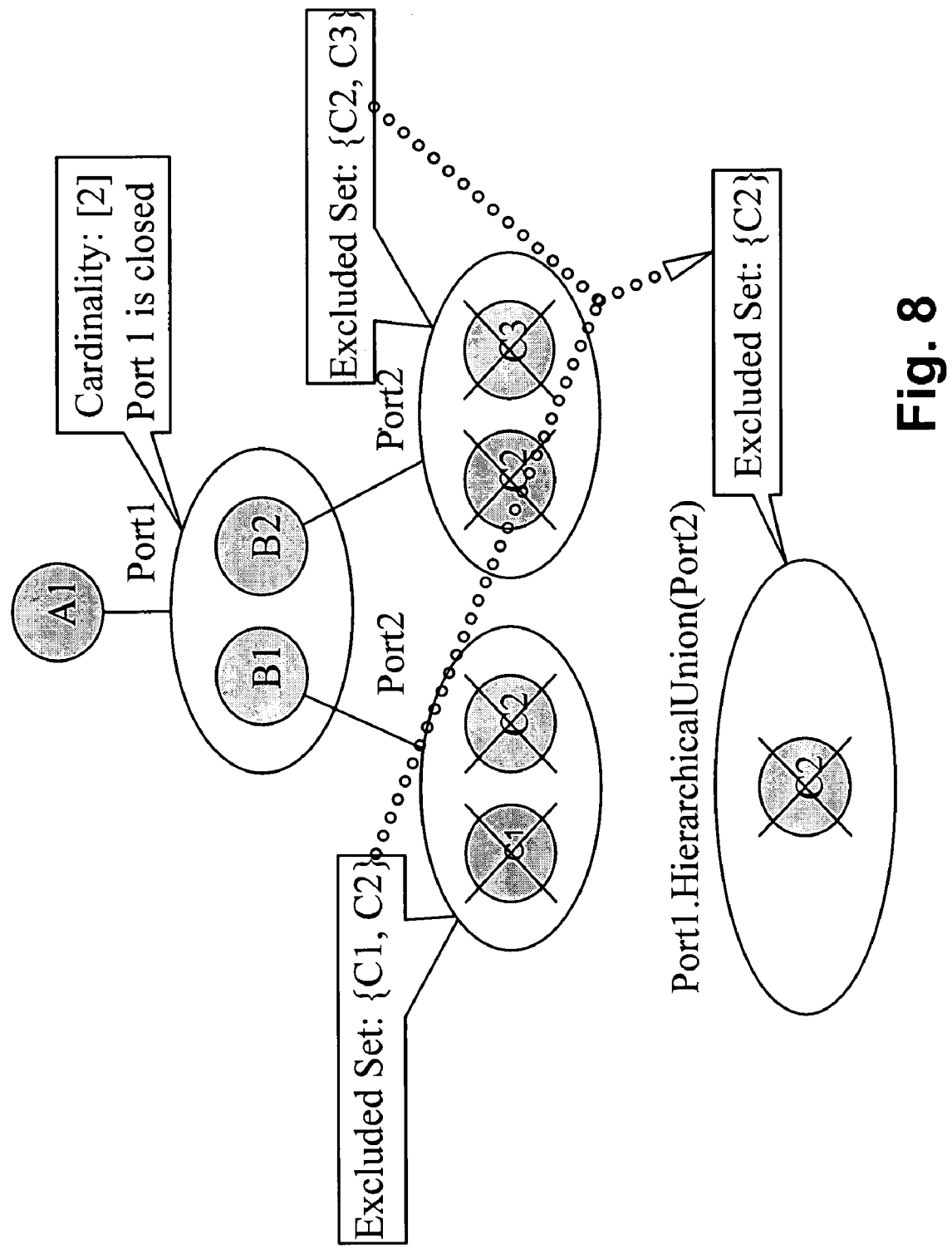
FIG. 8 illustrates the computation of the excluded set in accordance with one embodiment.

FIG. 8 illustrates the computation of the excluded set in accordance with one embodiment. In the example of FIG. 8, Port 1 is closed. C1 and C2 are excluded from B1.Port2. C2 and C3 are excluded from B2.Port2. Therefore, C2 is excluded from all Port 2s on Problem Bs in Port 1. Because it is not possible for the hierarchical union to have C2, C2 is excluded from it.

In one embodiment, solver 16 propagates the included set to a participating Port 2. When a Problem C is included in the hierarchical union, it must be included in at least one Port 2 on a Problem B in Port 1. If Port 1 is closed, it should have all its Problem Bs already as in the final solution. If the Problem C is excluded from every Port 2 on a Problem B except for one, then solver 16 includes the Problem C in the only Port 2 that has not excluded it yet.

Figure 9:
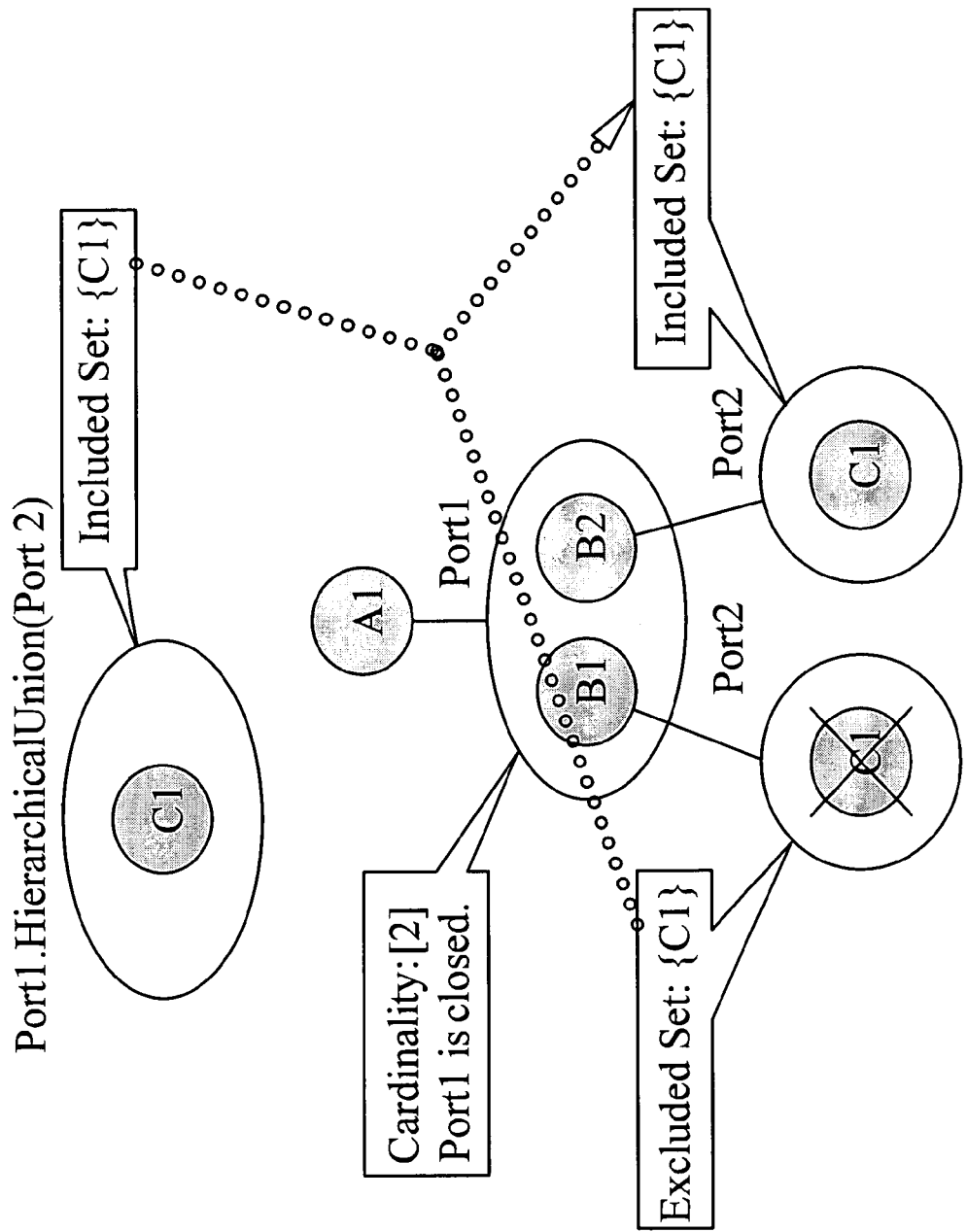
FIG. 9 illustrates the propagation of the included set in accordance with one embodiment.

FIG. 9 illustrates the propagation of the included set in accordance with one embodiment. In the example of FIG. 9, Port 1 is closed and has two Problem Bs, B1 and B2. C1 is included in the hierarchical union. This means that C1 must be included in either B1.Port2 or B2.Port2. Since B1.Port2 already excluded C1, C1 must be included in B2.Port2.

Figure 10:
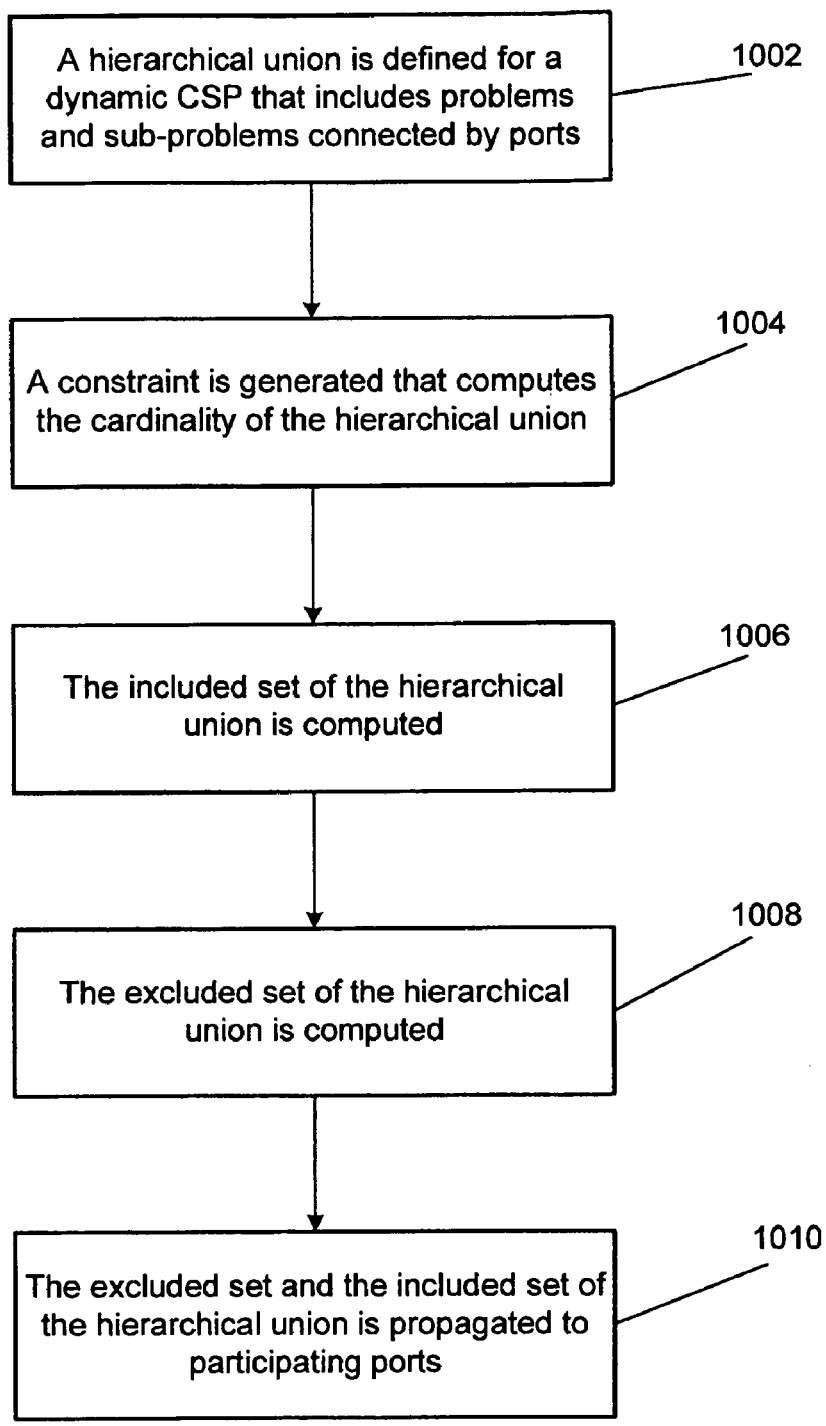
FIG. 10 is a flow diagram of the functionality of the dynamic constraint solver module when implementing a hierarchical union and associated constraint in accordance with one embodiment.

FIG. 10 is a flow diagram of the functionality of dynamic constraint solver module 16 when implementing a hierarchical union and associated constraint in accordance with one embodiment. In one embodiment, the functionality of the flow diagram of FIG. 10 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, a hierarchical union is defined for a dynamic CSP that includes problems and sub-problems connected by ports. The hierarchical union represents all problems in a lower port that is in a problem under another port.

At 1004, a constraint is generated that computes the cardinality of the hierarchical union.

At 1006, the included set of the hierarchical union is computed.

At 1008, the excluded set of the hierarchical union is computed.

At 1010, the excluded set and the included set of the hierarchical union is propagated to participating ports.

As disclosed, an embodiment is a solver for a dynamic CSP that defines a hierarchical union and allows a constraint to be defined over the hierarchical union. The hierarchical union includes a cardinality, an included and an excluded set that is propagated to affected ports.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer readable media having instructions stored thereon that, when executed by a processor, causes the processor to function as a dynamic constraint solver for solving a constraint satisfaction problem model that comprises a plurality of ports, the instructions comprising:
    defining a hierarchical union that comprises all problems in a lower port that is in a problem under another port in the model;
    generating a constraint that computes a cardinality of the hierarchical union;
    determining an included set and an excluded set for the hierarchical union; and
    propagating the included set and excluded set to participating ports of the hierarchical union.

2. The computer readable media of claim 1, wherein the model comprises a resource sum constraint, further comprising:
    using the hierarchical union to aggregate a resource variable for the resource sum constraint.

3. The computer readable media of claim 1, wherein the hierarchical union is a hierarchical union port.

4. The computer readable media of claim 1, further comprising:
    using the constraint to reduce a domain of at least one of the plurality of ports.

5. The computer readable media of claim 4, wherein at least one of the plurality of ports is closed.

6. The computer readable media of claim 1, wherein the included set comprises a collection of problems in the hierarchical union.

7. The computer readable media of claim 1, wherein the excluded set comprises a collection of problems excluded from hierarchical union.

8. The computer readable media of claim 1, wherein the constraint satisfaction problem model comprises a product configuration.

9. A computer implemented method for solving a constraint satisfaction problem model that comprises a plurality of ports, the instructions comprising:
    defining a hierarchical union that comprises all problems in a lower port that is in a problem under another port in the model;
    generating a constraint that computes a cardinality of the hierarchical union;
    determining an included set and an excluded set for the hierarchical union; and
    propagating the included set and excluded set to participating ports of the hierarchical union.

10. The method of claim 9, wherein the model comprises a resource sum constraint, further comprising:
    using the hierarchical union to aggregate a resource variable for the resource sum constraint.

11. The method of claim 9, wherein the hierarchical union is a hierarchical union port.

12. The method of claim 9, further comprising:
    using the constraint to reduce a domain of at least one of the plurality of ports.

13. A dynamic constraint satisfaction problem solver comprising:
    a constraint satisfaction problem model that comprises at least one problem and at least one sub-problem coupled to the problem via a port;
    a hierarchical union comprising all problems in a lower port that is in a problem under another port;
    a constraint that computes a cardinality of the hierarchical union;
    a computed included set of the hierarchical union;
    a computed excluded set of the hierarchical union;
    a propagation of the included set and the excluded set throughout the model.

14. The dynamic constraint satisfaction problem solver of claim 13, wherein the constraint satisfaction problem model represents a product configuration, and the solver is a product configurator.

15. The dynamic constraint satisfaction problem solver of claim 14, wherein the problems and sub-problems are components.

16. The dynamic constraint satisfaction problem solver of claim 13, wherein the constraint causes a domain of the cardinality to be reduced.

* * * * *

UNITED STATES PATENT AND TRADEMARK OFFICE
CERTIFICATE OF CORRECTION

| | | |
|---|---|---|
| PATENT NO. | : 8,126,834 B2 | Page 1 of 1 |
| APPLICATION NO. | : 12/427037 | |
| DATED | : February 28, 2012 | |
| INVENTOR(S) | : Chen et al. | |

It is certified that error appears in the above-identified patent and that said Letters Patent is hereby corrected as shown below:

On Title page 2, in column 2, under "Other Publications", line 5, delete "Sytems" and insert
-- Systems --, therefor.

Signed and Sealed this
Twenty-ninth Day of May, 2012

David J. Kappos
*Director of the United States Patent and Trademark Office*